United States Patent [19]
Morrison

[11] Patent Number: 4,663,654
[45] Date of Patent: May 5, 1987

[54] BLANKING SIGNAL GENERATOR FOR A SUBCARRIER LOCKED DIGITAL PAL SIGNAL

[75] Inventor: Eric F. Morrison, Redwood City, Calif.

[73] Assignee: Ampex Corporation, Redwood City, Calif.

[21] Appl. No.: 781,085

[22] Filed: Sep. 27, 1985

[51] Int. Cl.⁴ .............................................. H04N 3/24
[52] U.S. Cl. ...................................... 358/33; 358/13; 358/165
[58] Field of Search .......................... 358/13, 33, 165

[56] References Cited

U.S. PATENT DOCUMENTS

| | | | |
|---|---|---|---|
| 3,479,459 | 11/1969 | Scipione | 358/165 |
| 3,627,913 | 12/1971 | Ellis | 358/19 |
| 3,870,970 | 3/1975 | Chibana | 328/155 |
| 4,007,486 | 2/1977 | Inaba et al. | 358/13 |
| 4,089,026 | 5/1978 | Wilhelm et al. | 358/10 |
| 4,159,481 | 6/1979 | Mikado | 358/19 |
| 4,290,022 | 9/1981 | Puckette | 328/55 |
| 4,303,837 | 12/1981 | Ansaldi et al. | 307/262 |
| 4,307,346 | 12/1981 | Kurosawa et al. | 328/155 |
| 4,322,749 | 3/1982 | Weston | 358/119 |
| 4,405,898 | 9/1983 | Flemming | 328/155 |
| 4,419,662 | 12/1983 | Puskas et al. | 358/165 |
| 4,443,767 | 4/1984 | Reichert et al. | 328/155 |
| 4,486,892 | 12/1984 | Karijuka | 328/155 |
| 4,490,688 | 12/1984 | Borras et al. | 328/155 |

FOREIGN PATENT DOCUMENTS

| | | |
|---|---|---|
| 2615783 | 10/1977 | Fed. Rep. of Germany . |
| 2626933 | 12/1977 | Fed. Rep. of Germany . |
| 18179 | 1/1982 | Japan .................................. 358/165 |

OTHER PUBLICATIONS

H. Naitoh et al., *Digital VIT Signal Generator*, vol. 30, No. 2, Feb. 1976, pp. 114–120.

*Primary Examiner*—John W. Shepperd
*Attorney, Agent, or Firm*—George B. Almeida; Joel D. Talcott

[57] ABSTRACT

Non-orthogonality of the blanking region information caused by the 25 Hz offset in a digital PAL-encoded color television signal is corrected by a dynamic offset circuit. To this end, a plurality of waveforms describing the envelopes of the blanking, sync and burst are stored, and during video signal processing are sequentially addressed at a 25 Hz rate. The resulting assembled output blanking information is orthogonal to the television scanning frequency.

19 Claims, 7 Drawing Figures

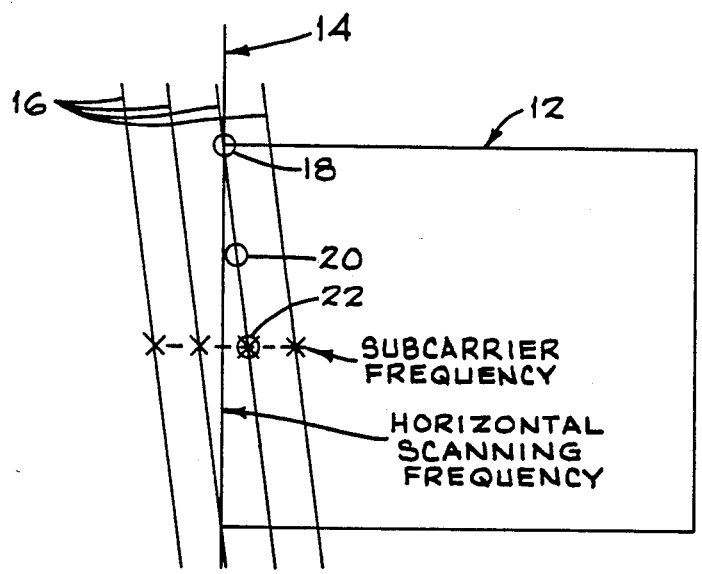
FIG_1
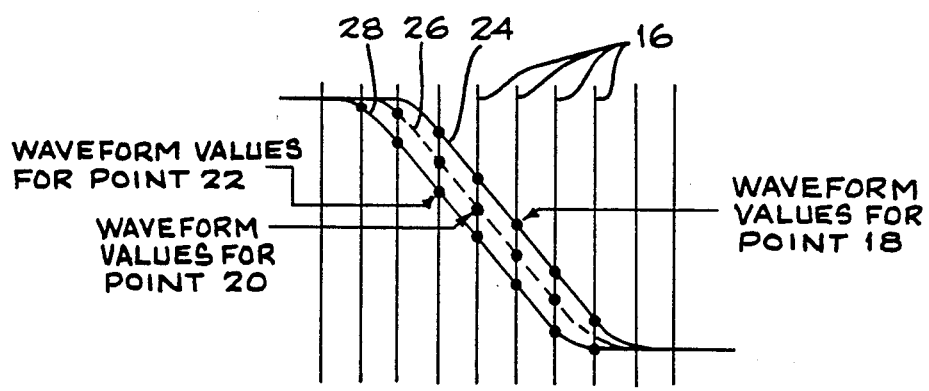
FIG_2

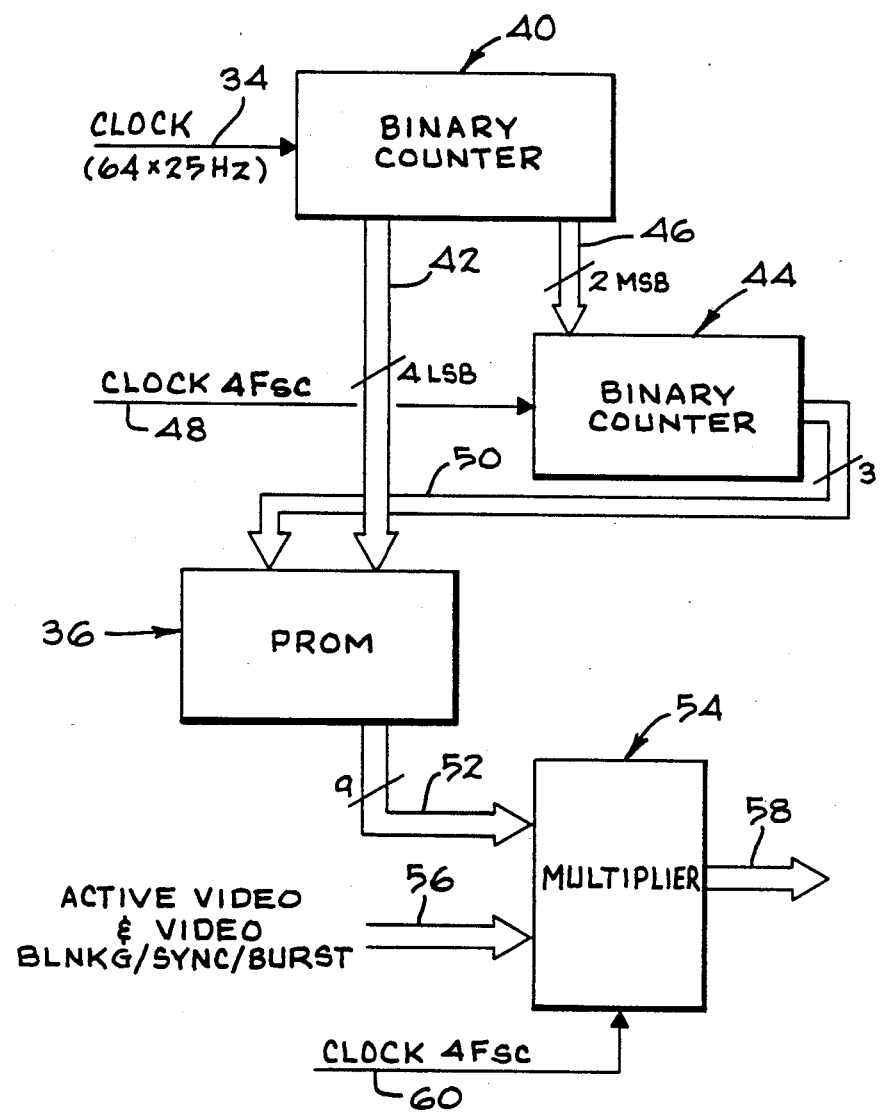
FIG_3

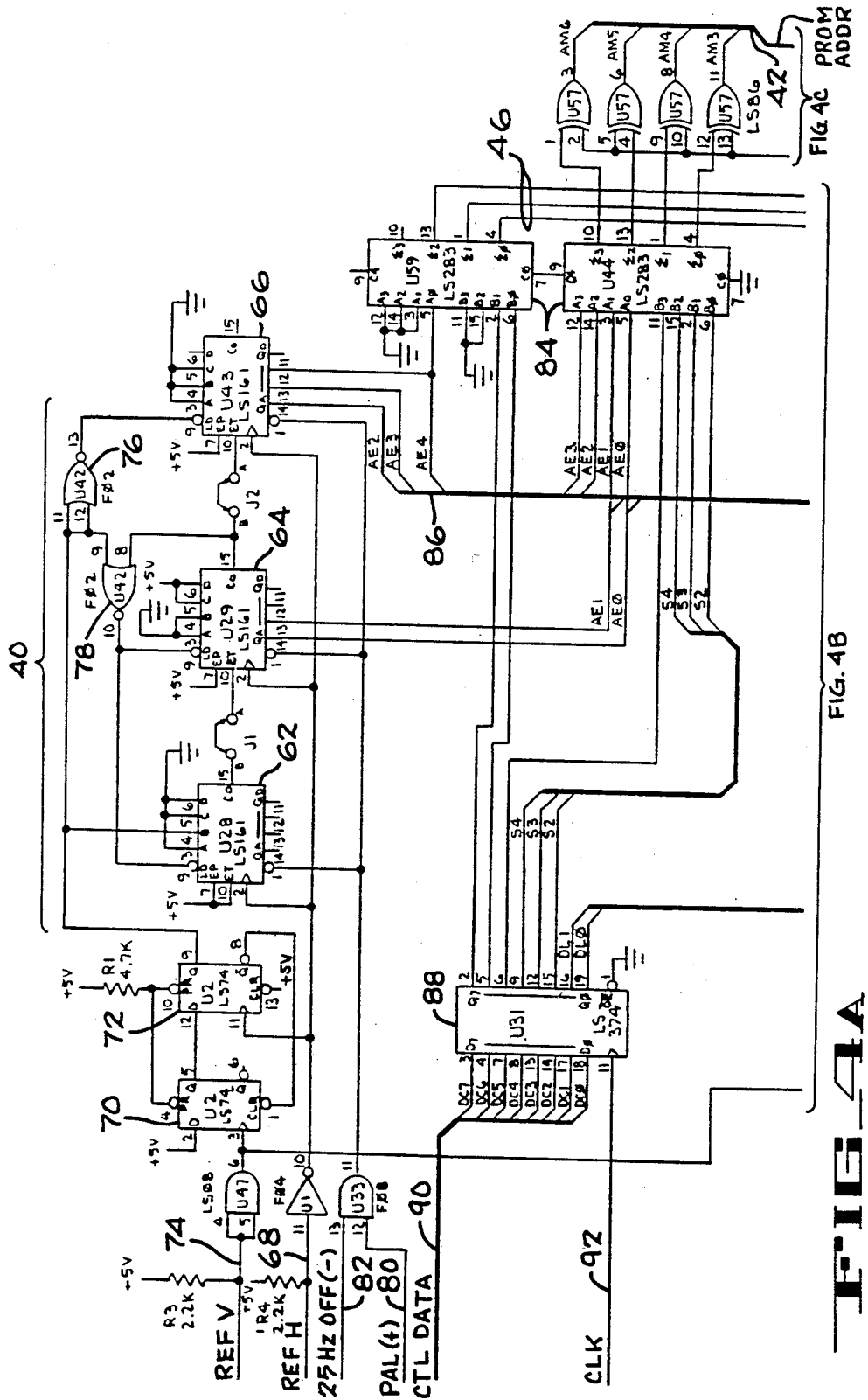

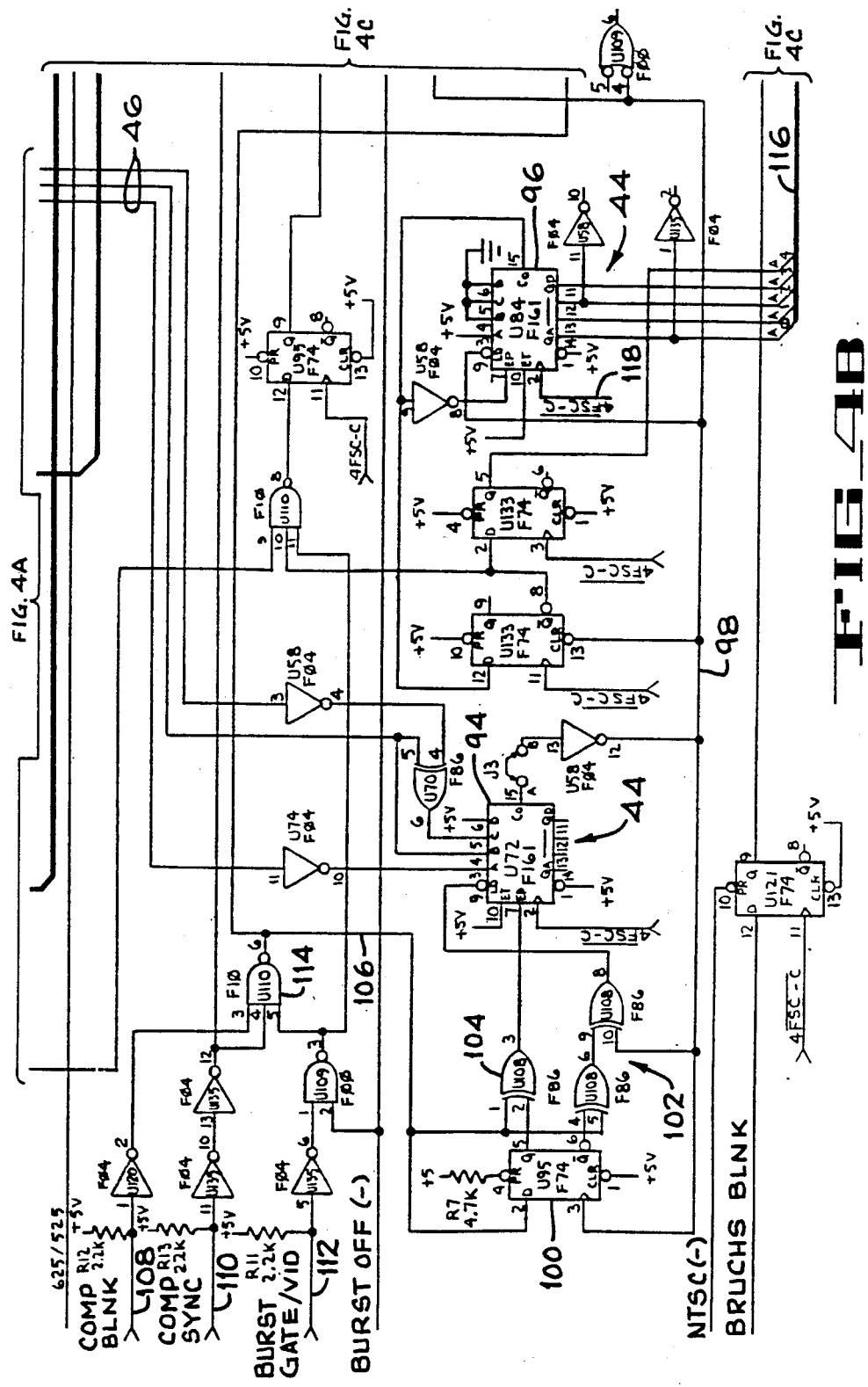

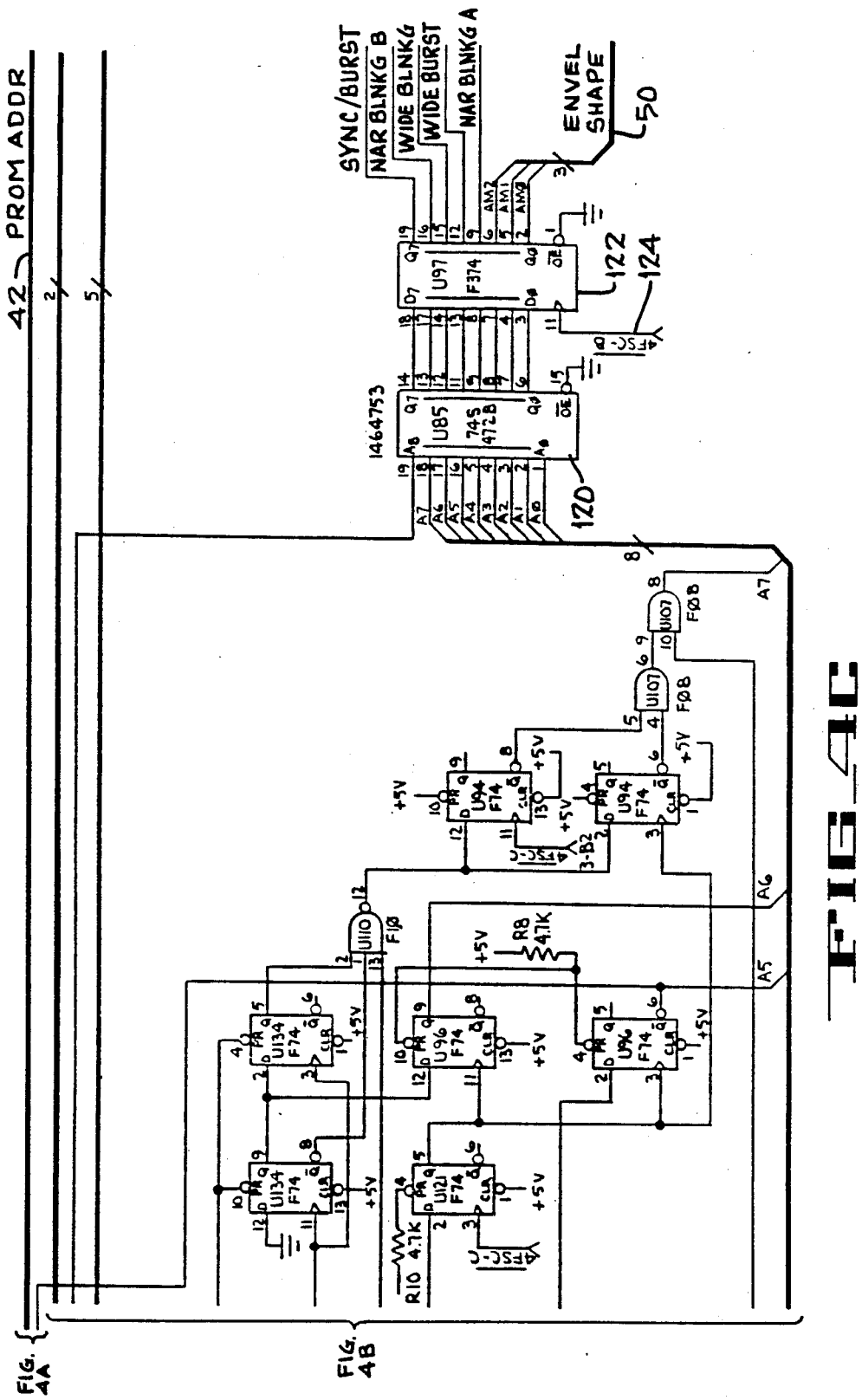

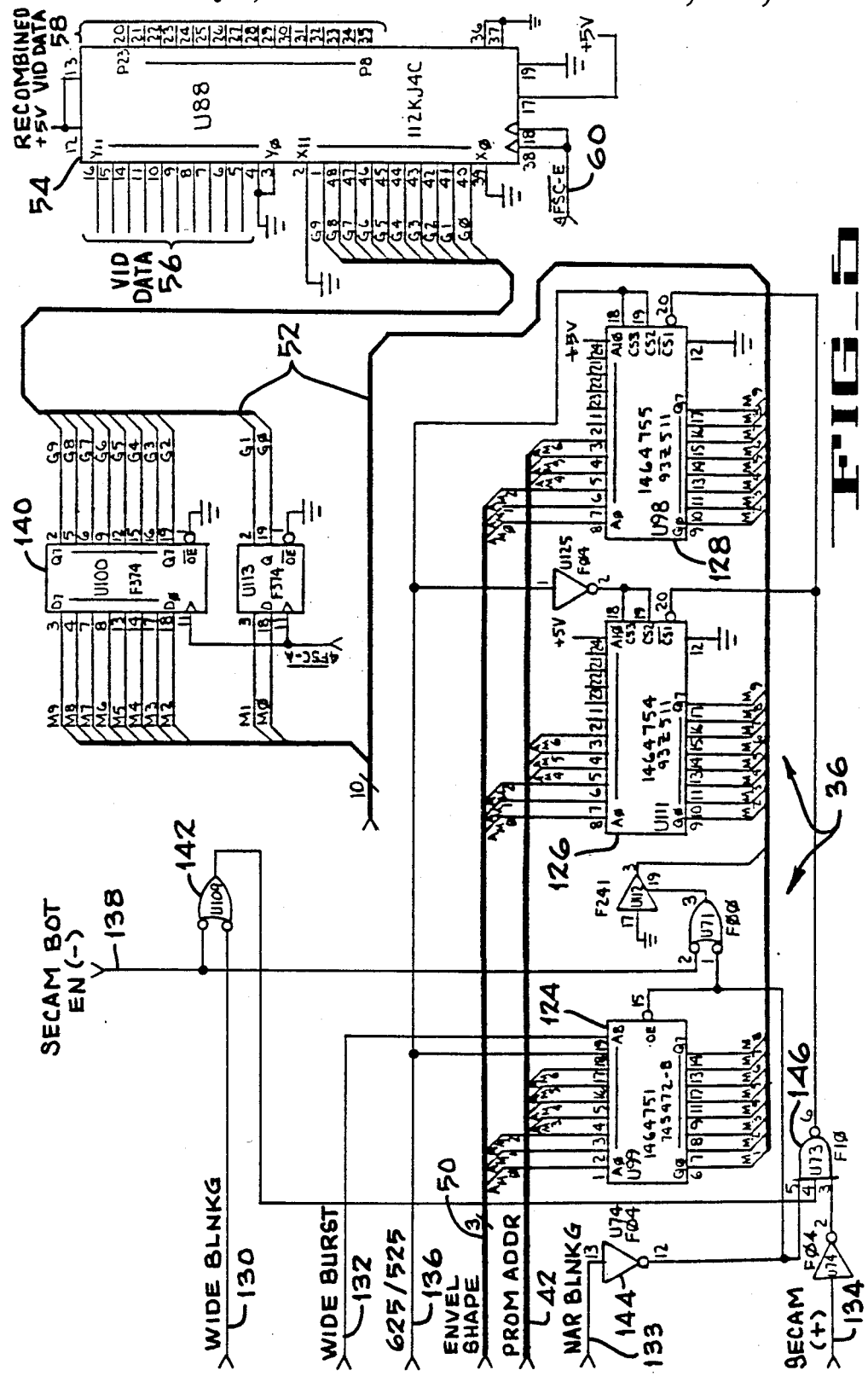
FIG_5

BLANKING SIGNAL GENERATOR FOR A SUBCARRIER LOCKED DIGITAL PAL SIGNAL

BACKGROUND AND SUMMARY OF THE INVENTION

The invention relates to the generation of television blanking information and more particularly, to the digital generation of PAL blanking region information via a dynamic offset circuit which makes the information appear orthogonal after digital to analog conversion.

In a television studio, or when otherwise recovering digitally sampled video signals from a recording media or other noisy source such as a satellite receiver, it is necessary to re-insert new video blanking, sync and burst timing information. That is, in such video processes, a sync generator is used to provide video sync blanking and burst signals, in order to maintain the proper relationship of all synchronizing information relative to the active video signal. In a system employing the NTSC color television standard, it is relatively simple to maintain the phase relationship between the color subcarrier and the horizontal sync of the television signal because there is a direct relationship between the two signals. That is, one signal is generated directly from the other whereby a fixed phase relationship between the signals is readily reproduced.

In the PAL standard, however, the relationship between the horizontal frequency and the color subcarrier frequency is more complex as shown by the relationship $F_{sc} = 1135/4\ F_h + 25$, where $F_{sc}$ is the color subcarrier and $F_h$ the horizontal frequency. This relationship results from the 25 Hz offset which is used in the PAL standard.

Stated more simply, in a standard rectangular television picture the horizontal blanking information such as sync and burst are orthogonally related to a vertical line along the left hand side of the picture. In an NTSC color television standard, since there is the fixed frequency relationship between horizontal frequency and the color subcarrier frequency, an orthogonal blanking region configuration readily is achieved. That is, the timing of all blanking region information begins exactly on the vertical line, regardless of whether the video signals are being processed in the analog or digital domain.

Likewise, in the PAL standard, if the video signals are being processed in the analog domain an orthogonal blanking region configuration also readily is achieved. That is, since an analog signal is not sampled and inherently is a continuous signal, the sync blanking and burst edges are readily generated in an orthogonal configuration. However, problems arise when a PAL-encoded video signal is processed entirely in the digital domain, as further discussed below.

Presently available time base correctors, (TBC's) digital video tape recorders (VTR's), and the like, typically process various portions of the video signal by analog means, particularly in the processing amplifier and D/A converter area. In such schemes, the video signal is put through a path which includes various complex digital processes culminating in digital-to-analog (D/A) conversion. The various timing signals however, are processed in a separate channel and are put through other analog processes unrelated to the digital video signal processes. Thus, when the video signal and the timing signals are recombined as required prior to D/A conversion, there are inherent instabilities in the timing between the blanking region information and the active video signal caused by drift, noise, etc.

However, notwithstanding the problem of instability, it is highly desirable in this generation of VTR's and associated TBC's that the video signal be processed entirely in the digital domain. Optimum video signal processing is achieved in the digital domain since the television picture is defined very accurately by the digital samples, and analog associated problems such as instability and signal drift inherently are overcome.

As previously discussed, in a digital PAL system the color subcarrier and thus the sampling clock are offset from the horizontal scanning frequency by the frame scanning frequency of 25 Hz. Accordingly, when blanking region information is re-inserted, the samples cannot be taken along the vertical line of previous mention. As a result the blanking interval information is non-orthogonal relative to the rectangular television picture. It follows that the 25 Hz offset in a digital PAL system causes intolerable horizontally displaced steps in the blanking interval timing signals, which cause the generation of an undesirable family of blanking, sync and burst envelopes that do not represent the instantaneous timing of the original television signal.

The present invention overcomes the disadvantages of processing video signals in the analog domain, while overcoming the problems of non-orthogonality of the blanking region information caused by the 25 Hz offset in a digital PAL-encoded color television system. The video signal and the timing information may be processed entirely in the digital domain, which is a decided advantage, for example, in a time base corrector, a digital VTR, etc. The invention digitally generates the blanking region information via a non-orthogonal circuit while processing the information with the same clock that processes the video data. To this end, a dynamic offset circuit is provided which makes the blanking region information appear orthogonal when the subsequent process of digital-to-analog conversion is performed, whereby the blanking interval timing signals of successive television frames or pictures are precisely synchronized.

More particularly, the envelopes of the blanking interval signals are stored as gain points or numbers in digital format in a programmable read-only-memory (PROM). A plurality of waveforms describing the desired envelope are stored, each with a slightly different phase value and in sufficient number to describe one sampling clock cycle. When processing a video signal, the gain points representing the waveforms are sequentially addressed at a 25 Hz rate, whereby the resulting output blanking interval information is offset by 25 Hz to correct for the PAL 25 Hz offset. Thus the blanking interval information is assembled orthogonally to the television scanning frequency.

To this end, a binary counter generates a binary word of, for example, 7-bits, representing the instantaneous phase of the 25 Hz waveform. The four least significant bits (LSB's) are used to address the PROM of previous mention, which contains gain numbers corresponding to sixteen phased envelope waveforms describing one quadrant of a color subcarrier cycle (Fsc). The two most significant bits (MSB's) from the counter represent the four quadrants of the full Fsc cycle and are used to control the phase of the start time of successive quadrants of the cycle. The start time actually is controlled by a presettable binary counter that is clocked at a 4 times subcarrier rate. It is configured as a shift register and coupled to receive the two MSB's from the binary counter.

BRIEF DESCRIPTION OF THE DRAWINGS

FIG. 1 is a graph pictorially representing a television picture on which is shown the 25 Hz offset inherent in a PAL system.

FIG. 2 is a graph depicting a plurality of waveforms descriptive of blanking interval envelopes and the relative sampling instants in a PAL system which define storable gain numbers.

FIG. 3 is a block diagram of the invention offset generator.

FIGS. 4A, 4B, 4C are a schematic diagram depicting an implementation of the binary counter and shift register of the circuit of FIG. 3.

FIG. 5 is a schematic diagram depicting an implementation of the PROM of the circuit of FIG. 3.

DETAILED DESCRIPTION OF THE EMBODIMENTS

In FIG. 1, the numeral 12 refers to a television picture (for example, a frame of video) of conventional rectangular configuration, wherein a vertical line 14 represents generally the start of the blanking intervals. In particular, line 14 represents the horizontal scanning frequency, and lines 16 represent the PAL television standard color subcarrier frequency (Fsc) and thus the sampling points of a 4Fsc sampling frequency, used in the description herein by way of example only. As may be seen, the proportions of the picture, lines and sampling points are exaggerated for purposes of description. At a time represented by a point 18, the 50% point of the blanking interval waveform corresponds to a zero crossing of the sampling phase. In the PAL system, due to the 25 Hz offset, subsequent point 20 also represents the 50% point of the waveform corresponding to a zero crossing of the sampling phase. As may be seen at point 20, and subsequent point 22, etc., the sampling points lie successively further from the vertical line 14 due to the 25 Hz offset between the sampling frequency and the subcarrier frequency. Thus in a digital PAL system, it is not possible to re-insert blanking along the vertical line 14 and therefore, the blanking interval information is not orthogonal.

Referring also to FIG. 2, in accordance with the invention, a sufficient number of waveforms to describe a sampling clock cycle are stored, each with a slightly different phase value, as represented by the waveforms 24, 26, 28, etc., in FIG. 2. In this example, the sampling frequency is 4Fsc whereby it is necessary to store only 16 waveforms which describe one quadrant of the Fsc cycle, and then repeat the quadrant four times, delaying the start address of each quadrant by one clock pulse each 4Fsc cycle. It may be seen that at the point 20, the envelope 26 appears to lead the envelope 24 of point 18 by one sample time, while the envelope 28 of point 22 appears to lead the envelope 26 of point 20 by one sample time. Thus if the 16 stored envelopes are sequentially read from memory at a 25 Hz rate, the blanking region will be offset by 25 Hz in a direction which compensates for the PAL 25 Hz offset. As a result, the blanking interval information is assembled orthogonally to the television scanning frequency when the new blanking information is reinserted in the video signal.

Since the offset between Fsc and $F_H$ occurs at one Fsc cycle per frame, and a frame frequency is 25 Hz, one cycle per frame equals 25 Hz offset. Since 4Fsc is the sampling frequency herein, and since 16 waveforms are stored in memory, if the plurality of waveforms are repeated four times during a picture, the stepping process is performed 64 times per picture. With a PAL subcarrier of 4.43 MHz, the resulting blanking signal timing error is of the order of 3.5 nanoseconds which is well beyond the resolution requirement of the horizontal blanking interval waveforms.

Referring to FIG. 3, a programmable read-only-memory (PROM) 36 is loaded with the gain numbers of the set of 16 waveforms of preselected shape and successive phase differences. The number of waveforms is sufficient to describe one quadrant of the color subcarrier cycle. If desired, sufficient waveforms may be stored for a full subcarrier cycle. By way of example only, the gain numbers corresponding to the waveforms are herein selected to define a sine squared edge although any edge shape may be stored and addressed in accordance with the invention. The waveforms may have uniform or non-uniform phase differences, wherein a non-uniform phase configuration is addressed at a complementary non-uniform rate to provide a uniform data output. The PROM 36 is addressed at 4Fsc via a 3-bit envelope address as further described below. A binary counter 40 is clocked by a clock signal on a line 34, of a frequency equal to 64×25 Hz and generates a binary word (of 7-bits) which represents the instantaneous phase of the 25 Hz waveform. Four LSB's of the counter 40 address the PROM 36 via a bus 42. Two MSB's, which represent the quadrant of the Fsc cycle and are used to control the phase of the start time for selecting the respective sets of waveforms, are fed via a bus 46 to a presettable binary counter 44 herein configured as a shift register. A third LSB is used to compensate for an overload condition, as further described below in FIG. 4B. The counter 44 is clocked by a 4Fsc clock on a line 48, and generates, in turn, the address signal at 4Fsc on an envelope shaping bus 50 coupled to the PROM 36. The gain numbers are sequentially addressed and are supplied as orthogonal blanking information to a multiplier 54 via a bus 52. The binary words representing the gain numbers comprise multiplying coefficients for modifying the gain of steady state switching waveforms that overlap the blanking envelope regions and which represent the peak magnitudes of the blanking, sync and burst signals. The multiplier 54 also receives the digital video signal, as well as blanking, sync and burst signals to be inserted in the video signal, via a 10-bit bus 56. As mentioned, the multiplying coefficients received from the PROM 36 are multiplied by numbers representing the overlapping signals for the blanking, sync and burst in the original video signal to generate precisely shaped, digital edges to be inserted into the video in place of the original blanking, sync and burst. The multiplier 54 is clocked by the 4Fsc clock on line 60 and supplies the recombined video signal and blanking interval information on a 12-bit output video bus 58. It is to be understood that the bus sizes are herein specified for purposes of description only and that other size buses may be used throughout the system.

The components of FIG. 3 are depicted further in the schematic diagrams of FIGS. 4,5, wherein like components are similarly numbered. In FIG. 4A, the binary counter 40 is formed of three IC's 62,64,66, which are presettable binary counters which count the inverted reference H pulses provided by system timing on a line 68. Counters 62 and 64 are clocked at 64×25 Hz and provide the addressing. A pair of D-type flip-flops 70,72 are clocked by reference vertical (V) pulses on a line 74, and the inverted reference horizontal (H) pulses on the line 68, respectively. The true output of flip-flop 70 is coupled to the input of flip-flop 72, and the not-true output of the latter is coupled back to the clear input of the former. The preset inputs of flip-flops 70,72 are coupled to +5 volts. The true output of the flip-flop 72 is fed to the B input of the IC 62, and also to a pair of NOR gates 76,78. NOR gate 78 is coupled to the load inputs of the IC's 62,64 and NOR gate 76 is coupled to the load input of IC 66. The carry output of IC 64 is coupled to the NOR gate 78 and to the enable input of IC 66. The carry output of IC 62 is fed to the enable input of IC 64. PAL (+) and 25 Hz OFFSET (−) logic signals on lines 80,82 respectively, are ended to the inverting pins 1 of the IC's 62, 64, 66. The IC's are preloaded via their preset inputs to provide the binary weighted addresses.

Pins 13,14 of IC 64 and pins 12,13,14 of IC 66 provide a 5-bit binary word as the output from the binary counter 40, which is coupled to respective A inputs of an adder 84 via bus 86. Another binary word is supplied to the B inputs of adder 84 via a latch 88, and corresponds to a desired fixed phase for use in a NTSC system wherein the counter 40 is disabled since there is no offset problem. Thus, the word is used to phase the counter output and is supplied by a control data signal on a bus 90 under microprocessor control and stored by latch 88.

In response to the 25 Hz OFFSET and PAL (+) signals on lines 82,80 the present offset generator operates in the PAL standard, and the binary counter 40 divides down the reference H pulse by 625 to provide a 25 Hz offset signal to the adder 84 on the bus 86. In an NTSC standard mode, since there is no offset problem, the binary counter 40 is disabled and the preset binary word of previous mention is supplied to the adder 84 via the latch 88 to provide a fixed address to the PROM 36 to select a corresponding preselected waveform from memory. Since this feature is not relevant to the invention, it is not discussed further herein. Suffice it to say that the latch 88 provides means for phasing the binary counter 40.

The adder 84 supplies a PROM address signal corresponding to the four LSB's (AM3-AM6) on the address bus 42, via a set of exclusive OR gates. The latter gates also are supplied with an inverted signal derived from composite blanking, composite sync and burst gate/video signals further discussed in FIG. 4B. The PROM address signal addresses the gain numbers corresponding to the 16 waveforms stored in the PROM 36 (FIG. 5) as previously discussed in FIG. 3 and shown below in FIG. 5. The adder 84 also supplies a quadrant select signal in the form of a 3-bit binary word corresponding to the three MSB's (AMφ-AM2) on the bus 46 of previous mention. Two bits of the bus 46 actually provide the quadrant select signal which represents the quadrant of the 4Fsc clock cycle and which control the phase of the start time for selecting the different quadrants. The third MSB of bus 46 is used in the event the adder 84 overloads.

Referring to FIG. 4B, the bus 46 is coupled to the preset inputs of the binary counter 44, which includes first and second presettable binary counters 94,96 configured as shift registers. The counter 94 counts the 4Fsc clocks (period 70 nanoseconds) when the signal at pin 7 enables the counting. The 25 Hz offset data from the adder 84 presets the count of counter 94, which then runs to its count and generates a signal on pin 15 and an inverted version on a line 98. The position of the pulses from pin 15 is determined by the preset numbers supplied via bus 46 to the load inputs of the counter 94, which reflect accordingly, the 25 Hz offset. The signal clocks a D-type flip-flop 100, and is coupled to a load input of the counter 94 via exclusive OR gates 102, as well as to the enable pin 7 via the flip-flop 100 and an exclusive OR gate 104. The gates 102 and 104 also are coupled to a line 106 which supplies a signal which marks the boundary of each transition in the blanking interval of the video signal.

More particularly, input signals COMP BLANKING, COMP SYNC and BURST GATE/VID are supplied via lines 108,110 and 112 respectively from the system sync generator (not shown). The timing of these three signals is generally known and indicate the start and stop times of the respective signal portions of the composite video signal. These signals are buffered and combined by inverters and a NAND gate 114. The resulting boundary marking signal on the line 106 is fed to the input of the flip-flop 100 and to the exclusive OR gates 102,104, whereby each of the transitions of the boundaries is converted to a respective pulse on the signal on line 98 by the edge detector circuit formed of the IC's 100,102,104 and 94 of previous mention. In accordance with the invention, the preset inputs fed to counter 94 determine the position of each pulse, i.e., provides a one clock cycle delay that occurs in the four quadrants of 25 Hz, which provides shifting the blanking, the sync and burst envelopes in quantized steps at the 25 Hz offset rate. That is, the preset numbers loaded into the counter 94 delay the start address, i.e., control the phase of the start time, for selecting the sets of stored waveforms by one clock pulse each 4Fsc cycle. The shifted boundary pulses on line 98 are used to signal when each sine squared edge (corresponding to the stored waveforms which, for example, are sine squared curves) is to be formed subsequently. The pulse signal is used to begin addressing the PROM 36 whereby the gain numbers corresponding to the waveforms appear at the PROM output corrected for the 25 Hz offset.

However, the respective addresses for accessing the PROM 36 must be provided. Thus the pulse signals on line 98 are fed to the counter 96 which counts 4Fsc clock cycles starting from a preset number each time a pulse on line 98 loads the preset count. The resulting signals Aφ-A3 on a bus 116 correspond to the binary outputs of the counter 96 and comprise the addresses which perform the envelope shaping. The Aφ signal is a one for one count of the 4Fsc clocks on clock line 118. Signal A1 is a binary division of the signal Aφ by two, signal A2 is a binary division by 2 of the signal A1, and signal A3 is a binary division by two of the signal A2. A signal A4 also is provided which makes a high to low transition on a 4Fsc transition following a terminal count of 16. The signals Aφ-A4 are supplied via bus 116 to a PROM 120 which provides various horizontal timing signals.

Three more signals, A5,A6, and A7, are generated in FIG. 4C to serve as address signals for the PROM 120. The signal A5 is low when the gain bits generated in the system envelope generator (not shown) are to be increasing from 0 to 1.0 and is high when the gain bits are going from 1.0 to 0. The signal A6 is a wide sync signal which is in a logic 1 state starting from a time before the start of the sine squared edge of the leading edge of the horizontal sync pulse is to be formed and remaining in the logic 1 state until a time after the sine squared trailing edge of the horizontal sync pulse is to be formed. The signal A7 is a wide burst signal which makes a transition to a logic 1 state starting at a time before the sine squared leading edge of the burst envelope is to be formed and which remains in the logic one state until a time after the sine squared trailing edge of the burst envelope is to be formed. Since the signals A5-A7 are not per se relevant to the invention, they are not described in further detail herein. The signals from PROM 120 are re-clocked via a latch 122 and the 4Fsc clock on a line 124. The lines AM$\phi$-AM2 of the latch 122 provide the envelope shaping signal on the address bus 50 (herein labeled an envelope shaping bus) of previous mention in FIG. 3 and are fed, along with the various horizontal timing signals, to the circuits of FIG. 5.

In FIG. 5, the PROM 36 includes a sync envelope PROM 124, a 525 blanking envelope PROM 126 and a 625 blanking envelope PROM 128. Input signals include the PROM address bus 42, the envelope shaping bus 50, a wide blanking line 130, a wide burst line 132 and a narrow blanking line 133, all supplied by the PROM 120 and latch 122 of FIG. 4C. A SECAM (+) logic signal, a 625/525 logic signal and a SECAM bottle enable(−) logic signal also are supplied on respective lines 134,136 and 138. The gain numbers which define the desired edge shape for the sync pulse and the edges of the burst envelope are stored in the PROM 124. The gain numbers for the blanking edges are stored in PROM 126 for a 525 line NTSC standard video blanking pulse. The PROM 128 is used to store the gain numbers defining the desired edge shape for the blanking pulse used in the 625 line PAL standard blanking pulse. The plurality of stored gain numbers defining each edge are selected by the AM0-AM2 address bits on the bus 50. These address bits cycle through the addresses to select the gain numbers 1-8 sequentially for values 0 to $1.0_{10}$ or from $1.0_{10}$ to 0 depending upon the state of signal A5 in FIG. 4C. The output gain numbers are placed on the bus 52 and re-clocked through a latch 140 clocked by the 4Fsc clock and are then coupled to the X input port of the multiplier 54 of previous mention in FIG. 3. Gates 142,144 and 146 combine the WIDE BLANKING, SECAM BOTTLE EN (−), and SECAM (+) signals on respective lines 130,138 and 134 respectively, to enable the PROM 128 (or 126 in NTSC) when blanking edges are to be formed, and the PROM 124 when sync or burst edges are to be formed.

The recombined video signal and new blanking interval information is fed to a downstream D/A converter (not shown), the output of which is a video signal whose blanking interval regions are orthogonal to the picture and in conformance with the television standard. Whereupon the correction of the PAL 25 Hz offset may be observed in the picture.

What is claimed is:

1. A circuit for generating an orthogonal waveform envelope from a digital television signal having a color subcarrier and a sampling clock which is offset by 25 Hz, which signal is scanned non-orthogonally relative to the television scanning frequency due to the 25 Hz offset, comprising:
    means for digitally storing a plurality of waveforms of preselected shape and different phases; and
    means coupled to the storing means for sequentially selecting successive stored waveforms at a rate which assembles the waveforms in an orthogonal configuration relative to the television scanning frequency.

2. The circuit of claim 1 wherein:
    the selecting means includes counter means for supplying preset signals representative of each of preselected portions of a color subcarrier cycle; and
    said storing means contents are consecutively addressed once for each preselected portion in response to the preset signals.

3. The circuit of claim 2 wherein the counter means includes:
    first binary counter means for supplying a PROM address signal which sequentially selects the waveforms and for supplying the preset signals as consecutive pulses with one clock cycle delay.

4. The circuit of claim 3 wherein:
    the storing means contains the waveforms in the form of sets of digital gain numbers; and
    the first binary counter means supplies the preset signals in the form of binary words indicative of the phase of the start time for addressing the sets of digital gain numbers.

5. The circuit of claim 4 including:
    second binary counter means for addressing the storing means upon the occurrence of each transition in the waveform envelope.

6. The circuit of claim 5 including:
    a first source of H-related pulses coupled to the first binary counter means; and
    a second source of color subcarrier pulses coupled to the second binary counter means.

7. The circuit of claim 3 wherein the preselected portion is a quadrant of four quadrants of the color subcarrier cycle, and the first binary counter means addresses the storing means with the preset signals to start for each quadrant.

8. The circuit of claim 7 wherein:
    said plurality of waveforms are sufficient in number to describe a quadrant of the color subcarrier cycle; and
    the first binary counter means runs at a 25 Hz offset rate.

9. The circuit of claim 8 wherein:
    the television signal is sampled at four times the color subcarrier; and
    said plurality of waveforms equals 16 waveforms.

10. The circuit of claim 1 wherein the waveforms describe timing envelopes in a PAL-encoded blanking interval, and the selecting means selects the stored waveforms at a 25 Hz offset rate.

11. The circuit of claim 1 wherein the storing means is a read-only-memory addressed by the selecting means.

12. The circuit of claim 1 wherein the waveforms are stored with uniform phase difference between each waveform and are selected at a uniform rate.

13. A circuit for generating orthogonal blanking interval envelopes corresponding to blanking, sync and burst from a digital PAL-encoded television signal wherein the color subcarrier and thus the sampling clock is offset from the horizontal scanning frequency by 25 Hz, comprising:
    PROM means for storing at respective addresses a plurality of waveforms descriptive of the envelopes and of slightly different phase; and
    binary counter means coupled to the PROM means for sequentially addressing the stored waveforms at a 25 Hz rate to assembly the waveforms orthogonally relative to the horizontal scanning frequency.

14. The circuit of claim 13 wherein the television signal is sampled at a multiple of the color subcarrier, wherein:

said PROM means stores a sufficient plurality of waveforms to describe one sampling clock cycle; and said binary counter means supply an address signal for sequentially selecting successive stored waveforms, and a preset signal for controlling the phase of the start time for selecting the respective plurality of waveforms.

15. The circuit of claim 14 wherein the television signal is sampled at four times the color subcarrier, wherein:

the PROM means stores a set of 16 waveforms describing one quadrant of a color subcarrier cycle; and the binary counter means supply the preset signal as representative of the four quadrants of the full color subcarrier cycle to control the phase of the start time for addressing successive sets of waveforms.

16. The circuit of claim 15 wherein the binary counter means includes:

a first counter for generating binary words in response to the horizontal scanning frequency;

a second counter operatively coupled to the first counter and preset by the binary words therefrom; and a third counter coupled to the second counter for supplying to the PROM means envelope shaping binary words commensurate with the boundaries of the blanking interval envelopes.

17. A method for generating an orthogonal blanking interval in a digital PAL-encoded television signal wherein the color subcarrier and thus the sampling clock is offset by 25 Hz from the horizontal scanning frequency, comprising:

storing a sufficient plurality of waveforms of selected shape to describe a sampling clock cycle; and sequentially selecting successive waveforms of the stored plurality at a 25 Hz rate to assemble the waveforms orthogonally relative to the horizontal scanning frequency.

18. The method of claim 17 wherein the step of storing includes:

storing digital gain numbers corresponding to 16 waveforms representative of one quadrant of a color subcarrier cycle.

19. The method of claim 18 wherein the step of selecting includes:

addressing the digital gain numbers four times to recover the waveforms corresponding of four quadrants of a full color subcarrier cycle; and delaying the start time for addressing the digital gain numbers one clock cycle each four times color subcarrier cycle.

* * * * *